United States Patent
Mukerji et al.

(10) Patent No.: US 9,071,797 B2
(45) Date of Patent: Jun. 30, 2015

(54) SYSTEMS AND METHODS FOR REMOTE ACCESS TO PROGRAMMING INFORMATION

(75) Inventors: Ankur Mukerji, Austin, TX (US); Scott White, Austin, TX (US); Charles Scott, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1462 days.

(21) Appl. No.: 12/126,362

(22) Filed: May 23, 2008

(65) Prior Publication Data

US 2009/0293088 A1    Nov. 26, 2009

(51) Int. Cl.
| | |
|---|---|
| H04N 5/445 | (2011.01) |
| H04N 21/482 | (2011.01) |
| H04N 21/45 | (2011.01) |
| H04N 21/462 | (2011.01) |
| H04N 21/84 | (2011.01) |
| H04N 7/173 | (2011.01) |
| H04N 21/4147 | (2011.01) |
| H04N 21/4227 | (2011.01) |
| H04N 21/432 | (2011.01) |
| H04N 21/6547 | (2011.01) |

(52) U.S. Cl.
CPC ......... H04N 5/44543 (2013.01); H04N 21/482 (2013.01); H04N 21/4532 (2013.01); H04N 21/4622 (2013.01); H04N 21/84 (2013.01); H04N 7/17318 (2013.01); H04N 21/4147 (2013.01); H04N 21/4227 (2013.01); H04N 21/4325 (2013.01); H04N 21/6547 (2013.01)

(58) Field of Classification Search
CPC ............ H04N 5/45543; H04N 21/482; H04N 21/4532; H04N 21/4622; H04N 21/84
USPC .......................... 725/45, 51, 107, 110, 78, 80
See application file for complete search history.

(56) References Cited

U.S. PATENT DOCUMENTS

| | | | |
|---|---|---|---|
| 6,820,278 B1 | 11/2004 | Ellis | |
| 2003/0005440 A1* | 1/2003 | Axelsson et al. | 725/39 |
| 2003/0005446 A1* | 1/2003 | Jaff et al. | 725/51 |
| 2003/0095791 A1 | 5/2003 | Barton et al. | |
| 2005/0028208 A1 | 2/2005 | Ellis et al. | |
| 2006/0031883 A1 | 2/2006 | Ellis et al. | |
| 2006/0031889 A1* | 2/2006 | Bennett et al. | 725/80 |
| 2006/0190978 A1* | 8/2006 | Russ et al. | 725/110 |
| 2007/0150918 A1 | 6/2007 | Carpenter et al. | |
| 2007/0199041 A1 | 8/2007 | Noll et al. | |
| 2008/0209491 A1* | 8/2008 | Hasek | 725/114 |
| 2009/0019492 A1* | 1/2009 | Grasset | 725/45 |
| 2009/0291668 A1* | 11/2009 | Huang et al. | 455/410 |

\* cited by examiner

*Primary Examiner* — Benjamin R Bruckart
*Assistant Examiner* — Anthony Bantamoi
(74) *Attorney, Agent, or Firm* — Guntin & Gust, PLC; Douglas Schnabel (57) ABSTRACT

A method for remotely accessing selected content can include receiving a list of content separate from a video stream. The list of content can include content previously recorded according to a user-defined recording schedule. The method can further include sending a request for content selected from the list of content, receiving the content through a network, and displaying the content.

23 Claims, 6 Drawing Sheets

SYSTEMS AND METHODS FOR REMOTE ACCESS TO PROGRAMMING INFORMATION

FIELD OF THE DISCLOSURE

The present disclosure generally relates to communications networks, and more particularly relates to systems and methods for remote access to programming information.

BACKGROUND

When watching television, viewers enjoy a variety of channel and viewing options. An Electronic Programming Guide (EPG) allows the viewer to see broadcast schedules for available channels. To better aid in identifying programming, the EPG may also provide descriptions of scheduled shows. Further, the EPG may provide the viewer with extended broadcast schedules, such as over the coming days or weeks, allowing the viewer to identify content for later viewing or recording.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
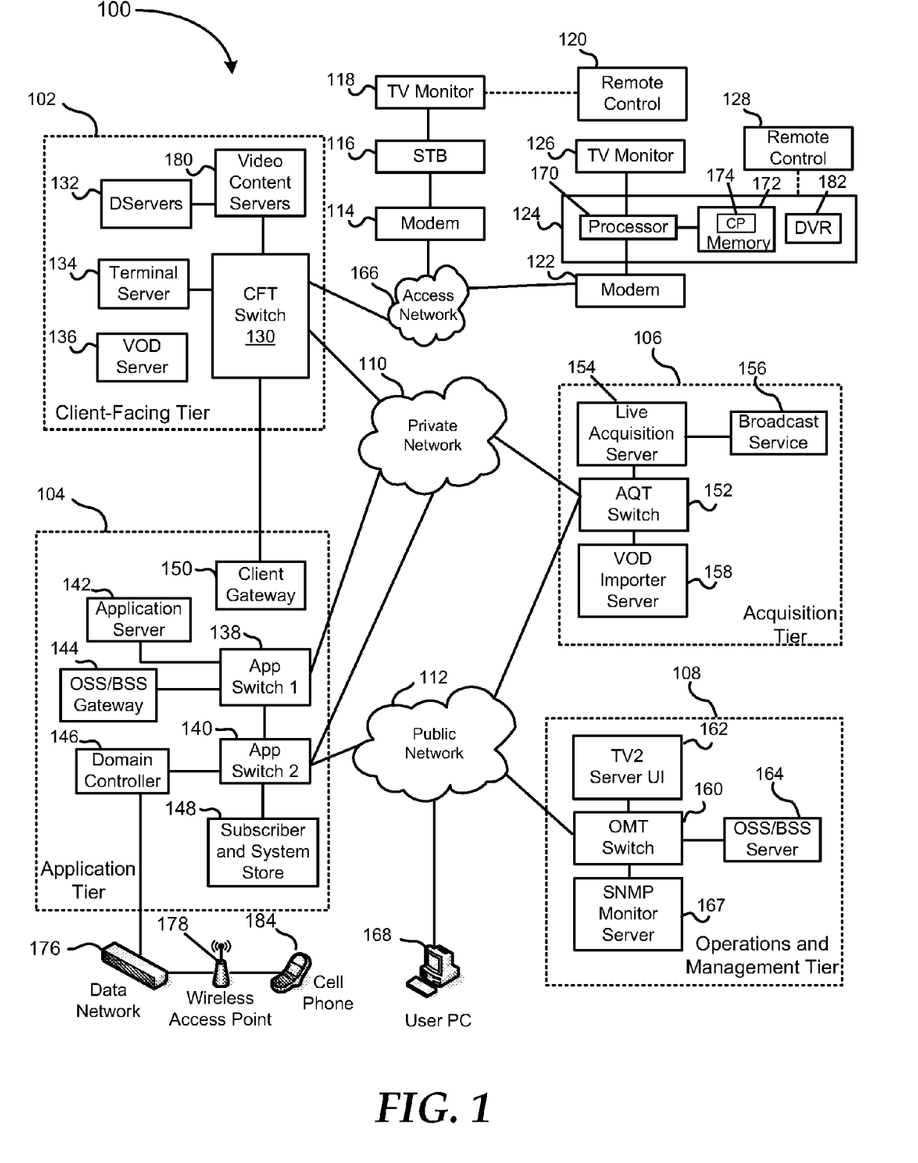
FIG. 1 is a block diagram illustrating an Internet Protocol Television (IPTV) network in accordance with one embodiment of the present disclosure.

FIG. 1 shows an Internet Protocol Television (IPTV) system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
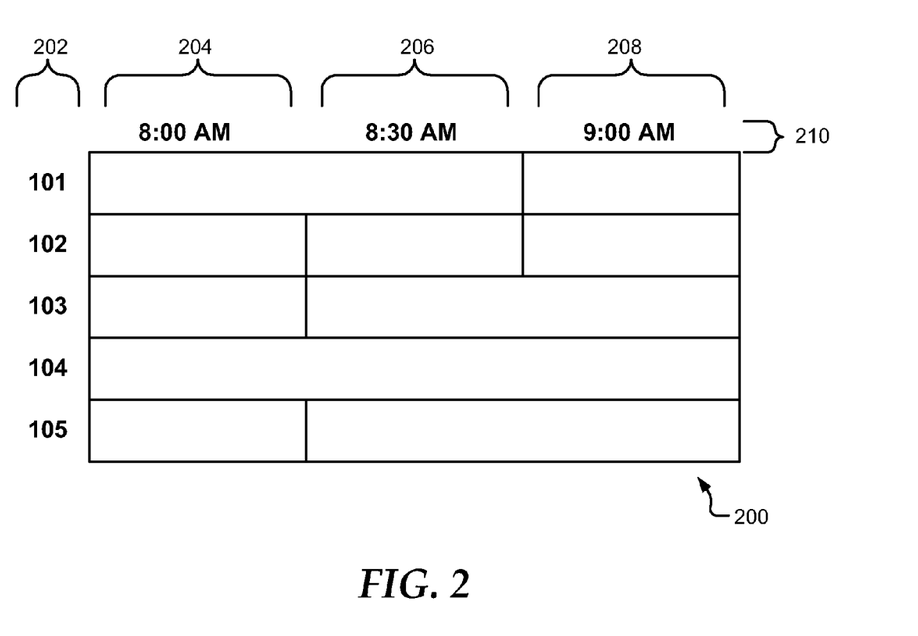
FIG. 2 is a schematic view of an exemplary electronic programming guide.

FIG. 2 shows an exemplary embodiment of an electronic programming guide (EPG) 200. The EPG 200 provides television viewers with on-screen television schedule information. EPG 200 may also include additional information, such as advertisements, detailed program descriptions, programming, or any combination thereof. The programming information is preferably displayed in a grid format, including columns 202 through 208. Column 202 displays the various channels. The list of channels may include all channels available, only those channels to which the viewer is subscribed, or a subset of favorite channels preselected by the viewer. Columns 204, 206, and 208 can indicate what is showing on the channels listed in column 202 in half hour increments. For example, titles of programs can be displayed within the columns 204, 206, and 208. Additionally, a brief description of the program may be displayed. For programs spanning multiple half hour increments, the title and description may be displayed across more than one of columns 204, 206, and 208. The time corresponding to the half hour increments is displayed in a row 210 across the top of EPG 200. Typically, more channels are available than can be shown at one time. Accordingly, the grid may be scrolled up or down through additional channels. Further, a user may scroll the grid to the left or right to view programming choices at different times.

Figure 3:
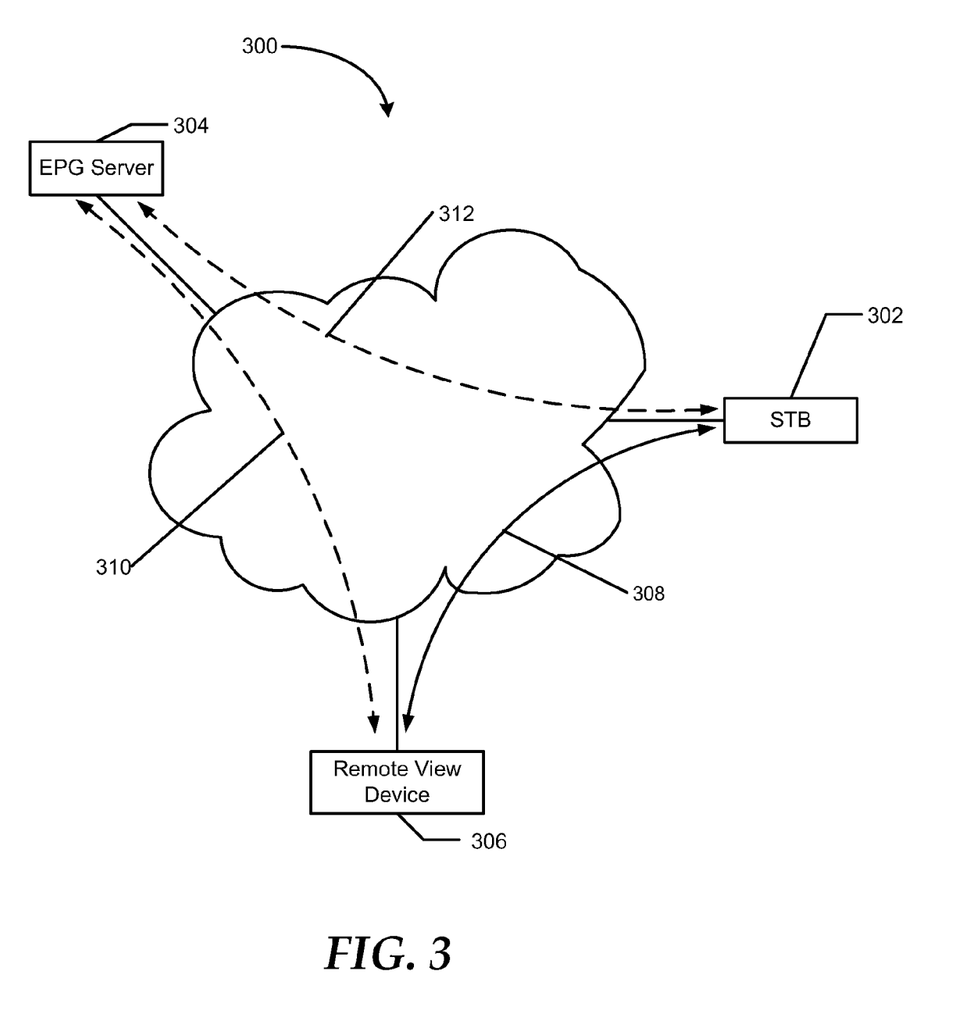
FIG. 3 is a block diagram illustrating a network in accordance with one embodiment of the present disclosure.

FIG. 3 is a schematic diagram illustrating an exemplary network for remote access to EPG information, generally designated 300. Network 300 can include an STB 302, such as STB 116 or STB 124, and an EPG server 304. The EPG server 304 may be implemented as part of video content servers 180, data servers 302, or other network servers. Alternatively, the EPG server 304 may be a separate server within the client-facing tier 102. EPG server 304 can provide STB 302 with schedule information, such as broadcast schedules for available channels. In an embodiment, EPG server 304 can provide a backup of user information, such as recording schedules, preferences, and parental control information, stored on the STB. In an alternate embodiment, STB 302 can cache the user information stored on EPG server 304. Additionally, recorded content can be stored on the EPG server 304 and/or the STB 302. A remote viewing device (RVD) 306 can access the information stored on STB 302 or EPG server 304 through network 300. RVD 306 may be a computer such as user PC 168, a cell phone such as cell phone 184, or another portable device with network access, such as a PDA. The RVD 306 can provide broadcast schedule information to a user separate from a TV monitor connected to the STB 302. Additionally, RVD 306 can allow the user to schedule recordings, change settings, or access content stored on the STB 302 or the EPG server 304.

In an exemplary embodiment, RVD 306 can retrieve information directly from the STB 302 through a communication path 308. For example, the STB 302 can provide a server interface, such as a web server, to allow the RVD 306 to access information stored on the STB 302. In another embodiment, RVD 306 can retrieve information through the EPG server 304 through a communication path 310. The EPG server 304 may provide the RVD 306 with access to the information stored on the EPG server 304. Additionally, the EPG server 304 may retrieve information from the STB 302 through a communication path 312 when requested by the RVD 306.

Figure 4:
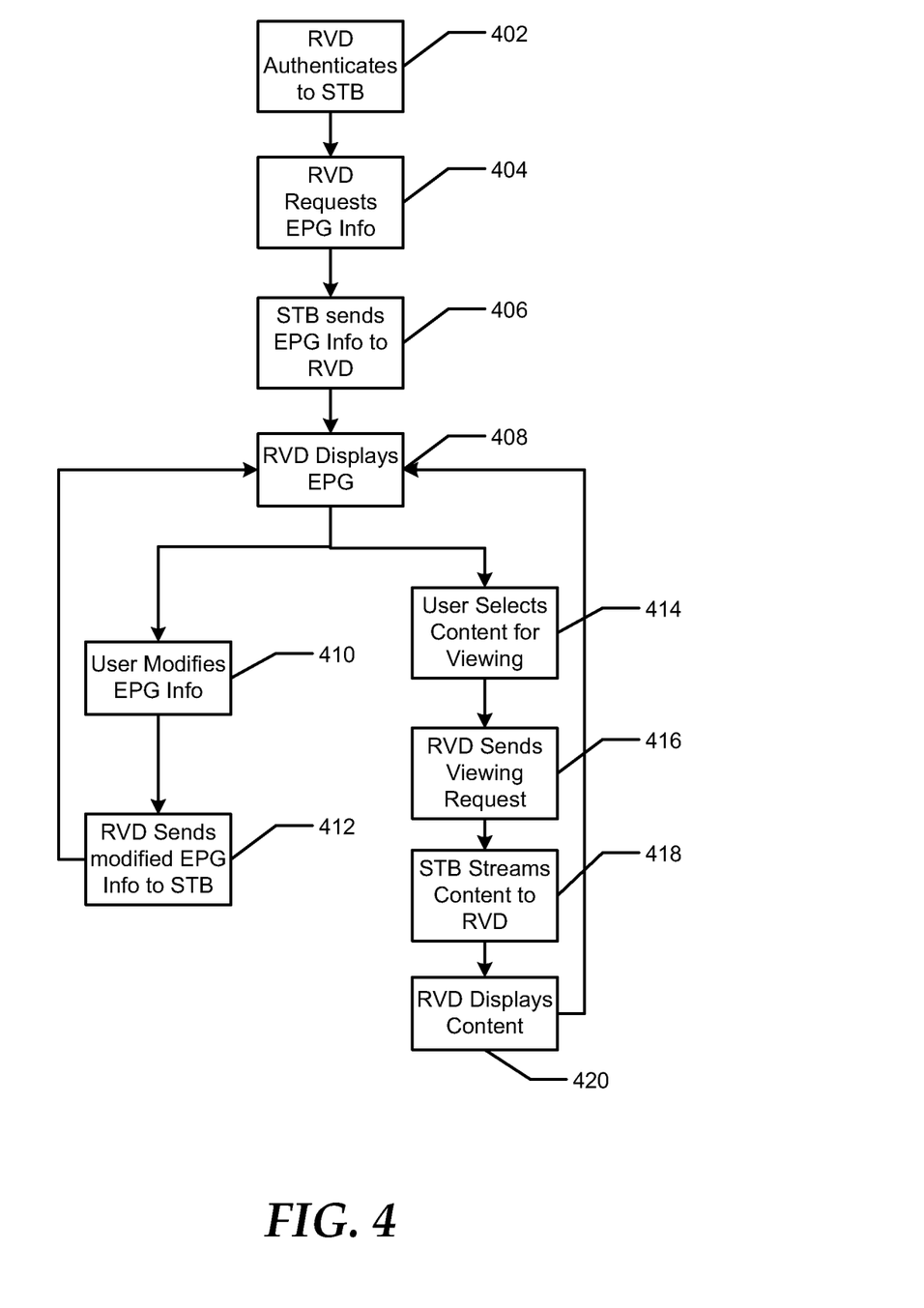
FIG. 4 is a flow diagram illustrating a method of remotely accessing content in accordance with one embodiment of the present disclosure.

FIG. 4 is a flow diagram illustrating an exemplary method for remotely accessing EPG information and content stored on an STB, such as STB 302. At 402, an RVD, such as RVD 306, can authenticate to the STB. Various methods of authentication can be used. For example, a user may be required to enter a username and password. Alternatively, the RVD and the STB may be paired, such that the STB recognizes the RVD based on a unique identifier, such as an electronic serial number (ESN), a MAC address, or the like. The STB may provide different levels of access based on the authentication. For example, a first access level can allow the RVD to access current broadcast schedules and currently available content, and a second level can allow the RVD to change scheduled recordings and parental control information. Additionally, communication between the RVD and the STB may be encrypted.

In an alternate embodiment, an EPG server, such as EPG server 304, can provide authentication. The STB and the RVD can authenticate to the EPG server. The EPG server can facilitate communication between the STB and the RVD. For example, the EPG server can send a current IP address for the RVD to the STB. Additionally, the EPG may provide encryption keys to the RVD and the STB.

At 404, the RVD can send a request to the STB for information, such as schedule information or user information. The user information can include parental control settings, scheduled recordings, information about recorded content, and the like. In an embodiment, the RVD can cache the information and only request information that has recently changed. Further, the RVD may request only a portion of the information as it is required. At 406, the STB can send the requested information to the RVD. In an embodiment, when the RVD requests recently changed information, the information can be difference encoded. The RVD can cache the information for access in an offline state when the network is unavailable. When network access is restored and the RVD returned to an online state, changes made on the RVD can be synchronized with the STB.

At 408, the RVD displays an EPG. The EPG can provide the user with the broadcast schedules, information regarding what is currently being watched, and which shows are currently scheduled for recording. At 410, the user can change user preferences through the EPG displayed on the RVD. For example, the user may select a show from the broadcast schedule for recording. Alternatively, the user may alter scheduled recordings, delete recorded content, or change parental control settings. At 412, the RVD can send the modified user preferences to the STB.

In an exemplary embodiment, the STB may send notifications to active RVDs when information has changed. For example, the STB may notify the RVD when a user schedules a recording through the STB or when a change in made to the program schedule by a service provider. Alternatively, a user may change the recording schedule through a first RVD and the STB may notify a second RVD.

Returning to 408, the user may select content for viewing, as illustrated at 414. In an embodiment, the user may select content from a list of prerecorded content stored on the STB. In an alternate embodiment, the user may select content being currently broadcast from the program schedule. At 416, the RVD can send a viewing request to the STB. The request can include the identity of the content selected by the user. The request can also include information about the RVD, such as screen size and resolution, type of network connection, available bandwidth, and the like. At 418, the STB can stream the content to the RVD. The content may be stored on the STB or may be retrieved from a remote storage device, such as another STB, the EPG server, or other network attached storage. In an embodiment, the STB can encode the content in a format appropriate for the RVD. For example, when the RVD has a low resolution screen or a limited bandwidth connection, the STB may reduce the resolution of high-definition content to reduce the needed bandwidth. Additionally, the STB may convert surround-sound audio to stereo when the RVD can only provide stereo output. At 420, the RVD can display the content to the user. In an embodiment, the RVD can cache the streamed content, allowing the viewer to rewind, pause, or suspend playback. Additionally, the cached content may be viewed during poor network conditions or when the RVD is in an offline state.

Figure 5:
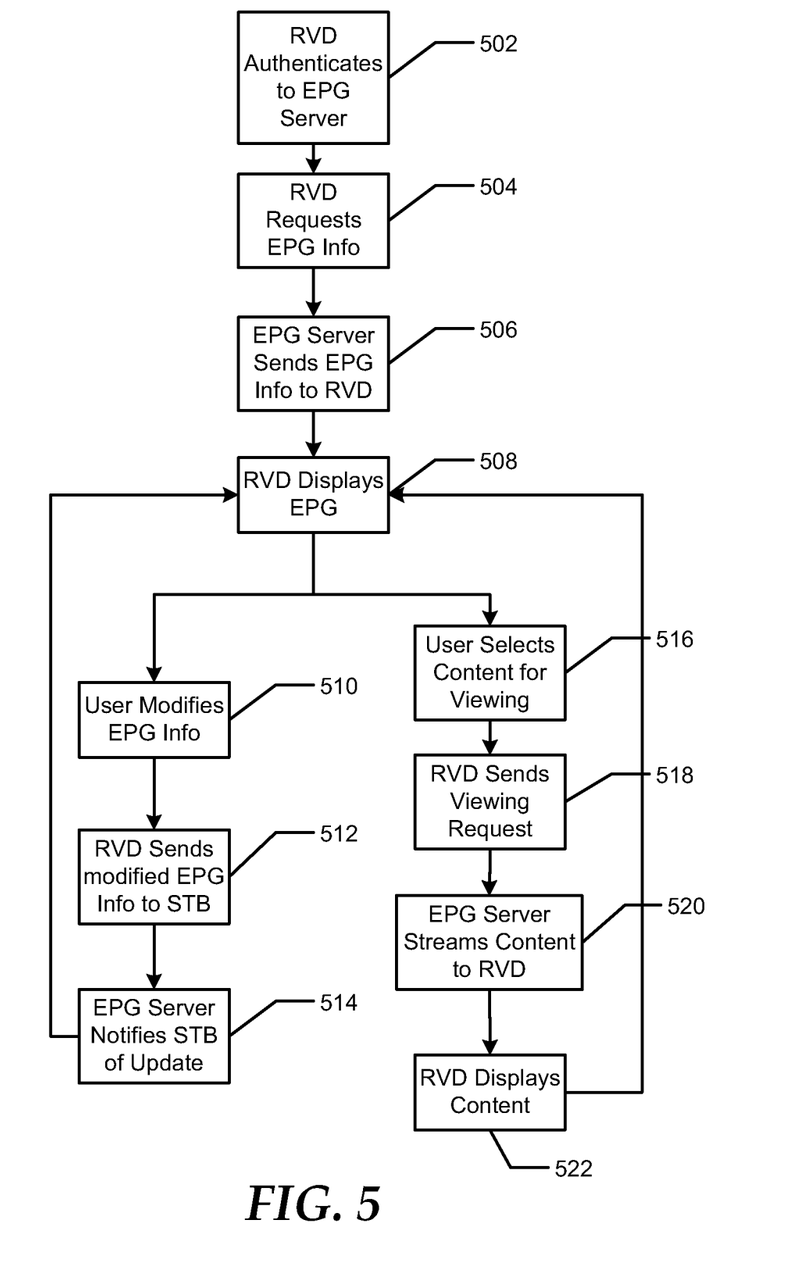
FIG. 5 is a flow diagram illustrating a method of remotely accessing content in accordance with another embodiment of the present disclosure.

FIG. 5 is a flow diagram illustrating an exemplary method for remotely accessing EPG information and content stored on an STB or an EPG server. At 502, an RVD, such as RVD 306, can authenticate to an EPG server, such as EPG server 304. Various methods of authentication can be used. Additionally, an STB, such as STB 302, can authenticate to the EPG server. At 504, the RVD can send a request to the EPG server for the EPG information. In an embodiment, the EPG server can maintain a current copy of the EPG information. Additionally, the EPG server may provide network-based storage of recorded content. For example, the EPG server can record content and make the recorded content available to the STB and the RVD. Alternatively, the STB may record the content and upload the recorded content to the EPG server.

In an alternate embodiment, the EPG server may cache the EPG information for access by the RVD. When the RVD requests new EPG information, the EPG server can retrieve new EPG information from the STB prior to providing the new EPG information to the RVD. Alternatively, the EPG server can maintain a current copy of a first portion of the EPG information and cache a second portion of the EPG information. For example, the EPG server may maintain a current copy of the programming schedule, and cache additional EPG information such as the recording schedule and information about recorded content.

In an embodiment, the RVD can cache the EPG information and only request EPG information that has recently changed. Additionally, the RVD can request only a portion of the EPG information as it is required. At 506, the EPG server can send the requested EPG information to the RVD. In an embodiment, when the RVD requests recently changed EPG information, the EPG information can be difference encoded.

The RVD may cache the EPG information for access in an offline state. Changes made to the EPG information on the RVD may be synchronized with the EPG server and the STB when network access is restored and the RVD returns to an online state. For example, the RVD may be a cell phone and cache the EPG information. When the cellular network connection is weak or non-existent, the user may browse schedule information stored in the cache and select a program for future recording. The cell phone can store the request and forward the request to the EPG server or the STB when the cell phone network becomes available or when the cell phone has access to an alternative network, such as a Wi-Fi network.

At 508, the RVD displays an EPG. The EPG can provide the user with information regarding what is currently being watched and which shows are currently scheduled for recording. At 510, the user can change EPG settings through the EPG displayed on the RVD. For example, the EPG may display a broadcast schedule. The user may select a show from the broadcast schedule for recording. Alternatively, the user may alter scheduled recordings, delete recorded content, or change parental control settings. At 412, the RVD can send the modified EPG settings to the EPG server. The EPG server can notify the STB of an update to the EPG information, as illustrated at 514. When the EPG server maintains the current copy of the EPG information, the EPG server can update the current copy and the STB may request the updated information periodically or as needed. The update can be sent using difference encoding. Alternatively, when the STB maintains the current copy of the EPG information, the EPG server can forward the modified EPG information to the STB. Additionally, the EPG server may request EPG information from the STB to update the cached EPG information.

Returning the 508, the user may select content for viewing, as illustrated at 516. In an embodiment, the user may select content from a list of prerecorded content or content being currently broadcast from the program schedule. The prerecorded content may be stored on the EPG server, the STB, a network attached storage, or another remote storage device.

At 518, the RVD can send a viewing request to the EPG server. The request can include the identity of the content selected by the user. The request can also include information about the RVD, such as screen size and resolution, type of network connection, available bandwidth, and the like. At 520, the EPG server can stream the content to the RVD. When the content is not stored on the EPG server, the EPG server may retrieve the content from the remote storage device prior to streaming the content to the RVD. In an embodiment, the remote storage device may stream the content to the EPG at a faster rate than the content is streamed to the RVD. Additionally, the EPG server can re-encode the content in a format appropriate for the RVD. At 522, the RVD can display the content to the user. In an embodiment, the RVD can cache the streamed content, allowing the viewer to rewind, pause, or suspend playback.

Figure 6:
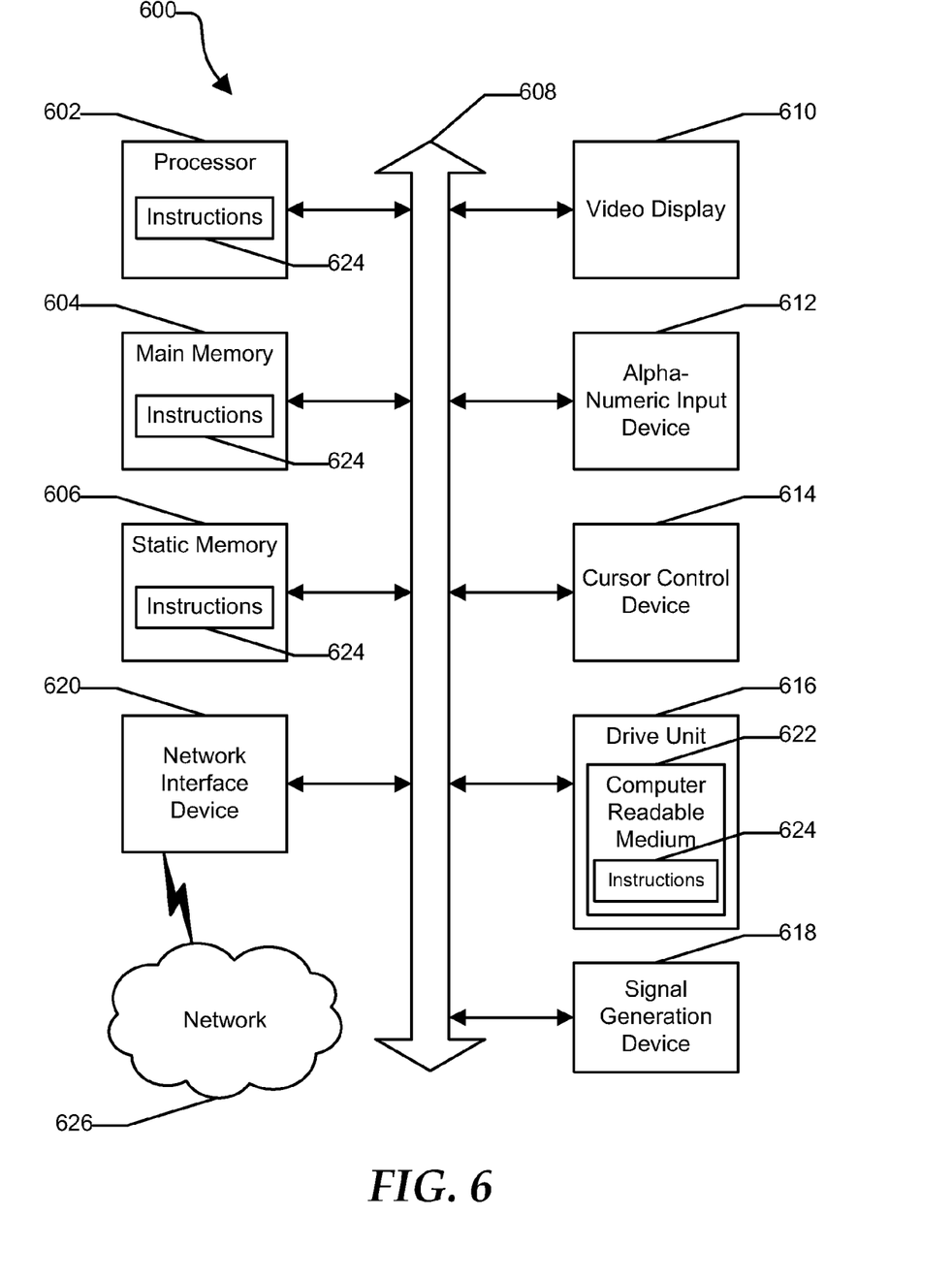
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:

receiving by a first remote device, an electronic programming guide from a set top box over a network responsive to authenticating of the first remote device based on an identifier associated with the first remote device, wherein the electronic program guide is stored on the set top box;

accessing, by the first remote device, a first level of a plurality of levels of the electronic program guide received at the first remote device, wherein only the first level of the plurality of levels of the electronic programming guide is enabled for accessing by the first remote device according to the authenticating;

selecting, by the first remote device, first television content from the first level of the plurality of levels of the electronic programming guide, wherein the selecting generates at the first remote device a modification to a user preference associated with the electronic programming guide;

sending, by the first remote device an indicator to the set top box to view the first television content;

sending, by the first remote device, an indicator to the set top box of the modification to the user preference associated with the electronic programming guide, wherein the set top box updates the electronic programming guide stored at the set top box according to the modification to the user preference and wherein the set top box sends a notification associated with the updating of the electronic programming guide to a second remote device;

receiving by the first remote device, the first television content from the set top box over the network;

storing, by the first remote device, the first television content that is received over the network; and displaying, by the first remote device, the first television content that is received over the network.

2. The method of claim 1 comprising:

selecting, by the first remote device, previously recorded television content that is stored on the set top box; and receiving, by the first remote device, the previously recorded television content that is selected from the set top box.

3. The method of claim 1 wherein the first television content is received by the set top box from a media server of a content service provider.

4. The method of claim 1 further comprising:

receiving, by the first remote device, user information over the network, wherein the user information is stored at the set top box; and sending, by the first remote device modifications associated with the user information to the set top box, wherein the user information stored at the set top box is updated according to the modifications sent by the first remote device.

5. A method comprising:

storing, by a system comprising a processor, an electronic programming guide at a set top box;

authenticating, by the system, a first remote device according to an identifier associated with the first remote device;

sending, by the system, the electronic programming guide stored at the set top box to the first remote device over a network responsive to the authenticating, wherein access to the electronic programming guide by first remote device is limited to only a first level of a plurality of levels of the electronic programming guide according to the authenticating;

receiving, by the system, from the first remote device a modification of a user preference of the first level of the plurality of levels of the electronic programming guide;

updating, by the system, the first level of the plurality of levels of the electronic programming guide stored at the set top box according to the modification of the user preference; and sending, by the system, a notification of the updating of the electronic programming guide of the set top box to a second remote device responsive to the updating.

6. The method of claim 5, comprising sending, by the system, television content to the first remote device according to the updating of the electronic programming guide.

7. The method of claim 5, further comprising:

storing, by the system, user information;

sending, by the system, the user information to the first remote device over the network;

receiving, by the system, modifications associated with the user information from the first remote device; and updating, by the system, the user information responsive to receiving the modifications.

8. The method of claim 6 further comprising re-encoding the television content into a reduced bandwidth format, wherein the reduced bandwidth format is selected based on information received from the first remote device indicating an available bandwidth of the first remote device.

9. The method of claim 5 wherein the first remote device is a cell phone, wherein the electronic programming guide is sent to the first remote device in response to a request for the electronic programming guide received from the first remote device, wherein the cell phone stores the request for the electronic programming guide and transmits the request for the electronic programming guide when access to the network becomes available to the cell phone.

10. A set-top box, comprising:

computer instructions; and a memory to store computer instructions; and a processor coupled to the memory, wherein the processor, responsive to executing the computer instructions, performs operations comprising:

authenticating a first remote device according to an identifier associated with the first remote device;

sending an electronic programming guide stored at the set-top box to the first remote device over a network responsive to the authenticating, wherein access to the electronic programming guide by first remote device is limited to only a first level of a plurality of levels of the electronic programming guide according to the authenticating;

receiving from the first remote device a modification of a user preference of the first level of the plurality of levels of the electronic programming guide;

updating of the first level of the plurality of levels of the electronic programming guide stored at the set-top box responsive to receiving the modification of the user preference; and sending a notification of the updating of the electronic programming guide stored at the set-top box to a second remote device responsive to the updating.

11. The set-top box of claim 10, wherein the processor, responsive to executing the computer instructions, performs operations comprising sending television content to the first remote device according to the updating of the user preference of the electronic programming guide.

12. The set-top box of claim 11, wherein the updating of the user preference of the electronic programming guide comprises a selection of the television content at the first remote device.

13. The set-top box of claim 11, wherein the processor, responsive to executing the computer instructions, performs operations comprising re-encoding the television content into a reduced bandwidth.

14. The set-top box of claim 10 wherein the first remote device is a cell phone.

15. A remote device, comprising:

a memory to store computer instructions; and a processor in communication with the memory, wherein the processor, responsive to executing the computer instructions, performs operations comprising receiving an electronic programming guide from a set top box over a network, responsive to authenticating of the remote device based on an identifier associated with the remote device;

accessing a first level of a plurality of levels of the electronic program guide received at the remote device according to the authenticating, wherein the only the first level of the plurality of levels of the electronic programming guide is enabled for the accessing by the remote device according to the authenticating;

selecting first television content from the first level of the plurality of levels of the electronic programming guide, wherein the selecting generates a modification of a user preference of the electronic programming guide;

sending a request to the set top box to view the first television content;

sending an indicator to the set top box of the modification of the user preference of the electronic programming guide, wherein the set top box updates the electronic program guide of the set top box according to the modification of the user preference and wherein the set top box sends a notification associated with the updating of the electronic programming guide to a second remote device;

receiving the first television content from the set top box over the network; and displaying the first television content.

16. The remote device of claim 15 wherein the selecting of the first television content comprises scheduling recording the first television content.

17. The remote device of claim 15 wherein the television content is received as a streaming content.

18. A network server, comprising:
a memory to store computer instructions; and
a processor in communication with the memory, wherein the processor, responsive to executing the computer instructions, performs operations comprising:
authenticating a first remote device according to an identifier associated with the first remote device;
receiving modifications to an electronic programming guide from the first remote device responsive to the authenticating wherein access to the electronic programming guide by the first remote device is limited to a first level of a plurality of levels of the electronic program guide according to the authenticating;
updating the electronic programming guide according to the modifications;
sending a notification of the updating of the electronic programming guide to a second remote device responsive to the updating;
receiving a request from the remote device to provide first television content selected from the first level of the plurality of levels of the electronic programming guide; and
providing the first television content to the remote device by way of a set top box for playback at the remote device, wherein the first television content is provided concurrently with a broadcast of the first television content by the network server.

19. The network server of claim 18 wherein providing first television content includes providing streaming content.

20. The network server of claim 18 wherein the processor, responsive to executing the computer instructions, performs operations comprising retrieving the first television content from a remote storage prior to providing the first television content to the remote device.

21. The network server of claim 20 wherein the remote storage includes a set-top box.

22. The network server of claim 18 wherein the processor, responsive to executing the computer instructions, performs operations comprising re-encoding the first television content into a reduced bandwidth format prior to providing the first television content.

23. The network server of claim 18 wherein the remote device is a cell phone.

* * * * *